United States Patent
Surnilla et al.

(10) Patent No.: US 9,726,106 B2
(45) Date of Patent: *Aug. 8, 2017

(54) METHODS AND SYSTEMS FOR HIGH PRESSURE PORT FUEL INJECTION

(71) Applicant: Ford Global Technologies, LLC, Dearborn, MI (US)

(72) Inventors: Gopichandra Surnilla, West Bloomfield, MI (US); Mark Meinhart, South Lyon, MI (US); Joseph F. Basmaji, Waterford, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 246 days.

This patent is subject to a terminal disclaimer.

(21) Appl. No.: 14/570,802

(22) Filed: Dec. 15, 2014

(65) Prior Publication Data

US 2016/0169145 A1 Jun. 16, 2016

(51) Int. Cl.
*F02D 41/38* (2006.01)
*F02D 41/30* (2006.01)
*F02D 41/34* (2006.01)

(52) U.S. Cl.
CPC ..... *F02D 41/3845* (2013.01); *F02D 41/3094* (2013.01); *F02D 41/345* (2013.01); *F02D 41/3854* (2013.01); *F02D 2041/3881* (2013.01); *F02D 2200/0602* (2013.01); *F02D 2200/101* (2013.01); *Y02T 10/44* (2013.01)

(58) Field of Classification Search
CPC ............. F02D 41/3845; F02D 41/3094; F02D 41/345; F02D 41/3854; F02D 2041/3881; F02D 2200/0602; F02D 2200/101

USPC .................. 701/103, 104; 123/431, 299–300
See application file for complete search history.

(56) References Cited

U.S. PATENT DOCUMENTS

| | | | |
|---|---|---|---|
| 5,355,859 A * | 10/1994 | Weber | F02D 41/3082 123/456 |
| 5,575,625 A | 11/1996 | Castel | |
| 7,055,500 B2 * | 6/2006 | Miyashita | F02P 5/1502 123/295 |
| 7,263,973 B2 * | 9/2007 | Akita | F02D 41/3094 123/299 |
| 7,281,517 B2 * | 10/2007 | Miyazaki | F02D 41/30 123/431 |
| 7,353,798 B2 | 4/2008 | Tokuda et al. | |
| 7,389,766 B2 | 6/2008 | Akita et al. | |
| 8,245,693 B2 | 8/2012 | Surnilla et al. | |

(Continued)

OTHER PUBLICATIONS

Vanderwege, Brad A. et al., "Direct Injection Fuel Pump," U.S. Appl. No. 14/547,998, filed Nov. 19, 2014, 74 pages.

(Continued)

*Primary Examiner* — Stephen K Cronin
*Assistant Examiner* — Susan Scharpf
(74) *Attorney, Agent, or Firm* — Julia Voutyras; McCoy Russell LLP

(57) ABSTRACT

Systems and methods for improving fuel injection of an engine that includes a cylinder receiving fuel from two different fuel injectors is disclosed. In one example, fuel is supplied to port fuel injectors and direct fuel injectors via a same high pressure fuel pump, and high pressure port fuel injection is activated at times where direct fuel injection would supply less fuel than is desired or an inconsistent amount of fuel.

7 Claims, 4 Drawing Sheets

(56) References Cited

U.S. PATENT DOCUMENTS

| | | | |
|---|---|---|---|
| 8,776,764 B2 | 7/2014 | Basmaji et al. | |
| 9,404,435 B2* | 8/2016 | Ranga | F02D 41/3094 |
| 2003/0127070 A1 | 7/2003 | Xu | |
| 2004/0065747 A1* | 4/2004 | Petrone | F02D 41/34 |
| | | | 239/5 |
| 2005/0172931 A1* | 8/2005 | Mori | F02D 41/3094 |
| | | | 123/305 |
| 2005/0199218 A1* | 9/2005 | Hashima | F02D 41/3029 |
| | | | 123/431 |
| 2007/0199542 A1 | 8/2007 | Tokuda et al. | |
| 2011/0040472 A1* | 2/2011 | Rayl | F02D 41/402 |
| | | | 701/103 |
| 2011/0202255 A1* | 8/2011 | Hauser | F02D 41/008 |
| | | | 701/103 |
| 2011/0251808 A1* | 10/2011 | Serra | F02D 41/20 |
| | | | 702/64 |
| 2011/0278369 A1* | 11/2011 | Serra | F02D 41/20 |
| | | | 239/5 |
| 2012/0048242 A1* | 3/2012 | Surnilla | F02M 39/02 |
| | | | 123/497 |
| 2012/0167859 A1* | 7/2012 | Basmaji | F02D 19/0605 |
| | | | 123/456 |
| 2013/0197837 A1* | 8/2013 | Rosel | F02D 41/20 |
| | | | 702/64 |
| 2014/0074378 A1* | 3/2014 | Iwai | F02D 43/04 |
| | | | 701/104 |
| 2014/0238340 A1* | 8/2014 | Dunn | F02M 43/00 |
| | | | 123/299 |

OTHER PUBLICATIONS

Surnilla, Gopichandra et al., "Methods and Systems for Fixed and Variable Pressure Fuel Injection," U.S. Appl. No. 14/570,546, filed Dec. 15, 2014, 51 pages.

Surnilla, Gopichandra et al., "Zero Flow Lubrication for a High Pressure Fuel Pump," U.S. Appl. No. 14/586,683, filed Dec. 30, 2014, 59 pages.

Surnilla, Gopichandra et al., "High Pressure Fuel Pumps with Mechanical Pressure Regulation," U.S. Appl. No. 14/243,615, filed Apr. 2, 2014, 53 pages.

Surnilla, Gopichandra et al., "Methods and Systems for Fixed and Variable Pressure Fuel Injection," U.S. Appl. No. 14/570,664, filed Dec. 15, 2014, 63 pages.

* cited by examiner

METHODS AND SYSTEMS FOR HIGH PRESSURE PORT FUEL INJECTION

FIELD

The present description relates to a system and methods for adjusting operation of fuel injectors for an internal combustion engine. The methods may be particularly useful for an engine that includes high pressure port and direct fuel injectors.

BACKGROUND AND SUMMARY

Direct fuel injection systems provide some advantages over port fuel injection systems. For example, direct fuel injection systems may improve cylinder charge cooling so that engine cylinder's may operate at higher compression ratios without incurring undesirable engine knock. However, direct fuel injectors may not be able to provide a desired amount of fuel to a cylinder at higher engine speeds and loads because the amount of time a cylinder stroke takes is shortened so that there may not be sufficient time to inject a desired amount of fuel. Consequently, the engine may develop less power than is desired at higher engine speeds and loads. On the other hand, port injected engines may provide a sufficient amount of fuel to a cylinder at higher engine speeds because the port injector may be open from intake valve closing timing of one cylinder cycle to intake valve closing time during a next cylinder cycle. However, port fuel injection tends to provide considerably less cylinder charge cooling as compared to directly fueling a cylinder because of the port fuel injector's location and because the lower fuel injection pressure of port injected fuel may result in less effective fuel vaporization. Thus, there may be opportunities to improve port and directly fueled engines.

The inventors herein have recognized the above-mentioned disadvantages and have developed a method for fueling a cylinder, comprising: activating a port fuel injector in response to a request to inject a fuel amount into a cylinder during a cylinder cycle while engine speed is greater than a threshold engine speed at which a direct fuel injector may supply the fuel amount during a predetermined crankshaft interval.

By activating a port fuel injector during a cylinder cycle in response to a request to inject a fuel amount into a cylinder during a cylinder cycle that is greater than a threshold amount while engine speed is greater than a threshold engine speed at which the direct fuel injector may supply the fuel amount during a predetermined crankshaft interval, it may be possible to provide the technical result of increasing fuel flow to the cylinder so that the cylinder may provide additional torque as compared to if only the direct fuel injector is operated. Further, by supplying fuel to the port fuel injector via a high pressure pump, it may be possible to provide additional cylinder charge cooling, thereby providing increased engine torque.

The present description may provide several advantages. Specifically, the approach may reduce engine air-fuel errors. Additionally, the approach may allow an engine to achieve power levels that might not be achievable by a direct fuel injection only fuel system. Further, the approach may improve engine fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
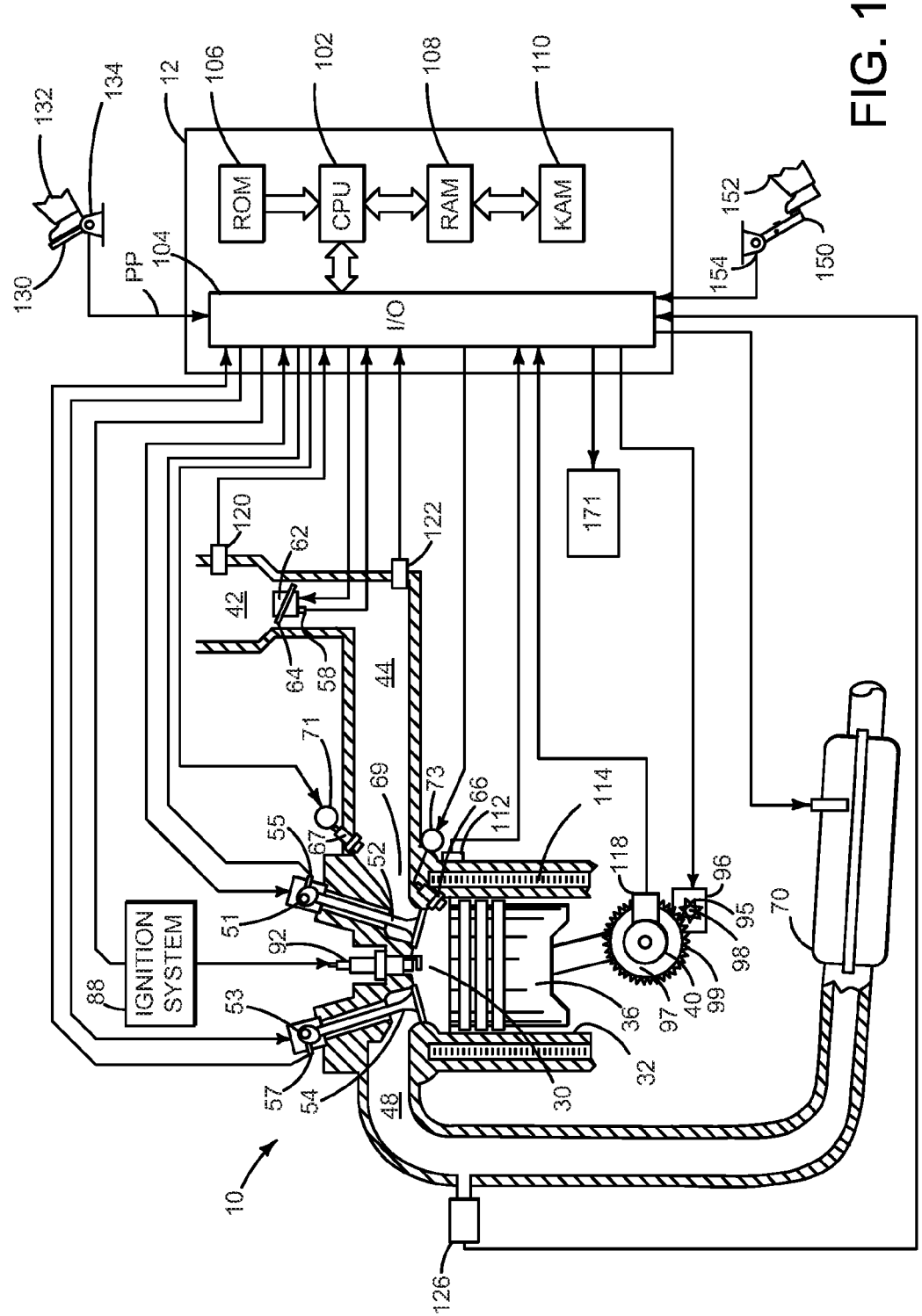
FIG. 1 is a schematic diagram of an engine.
Figure 2:
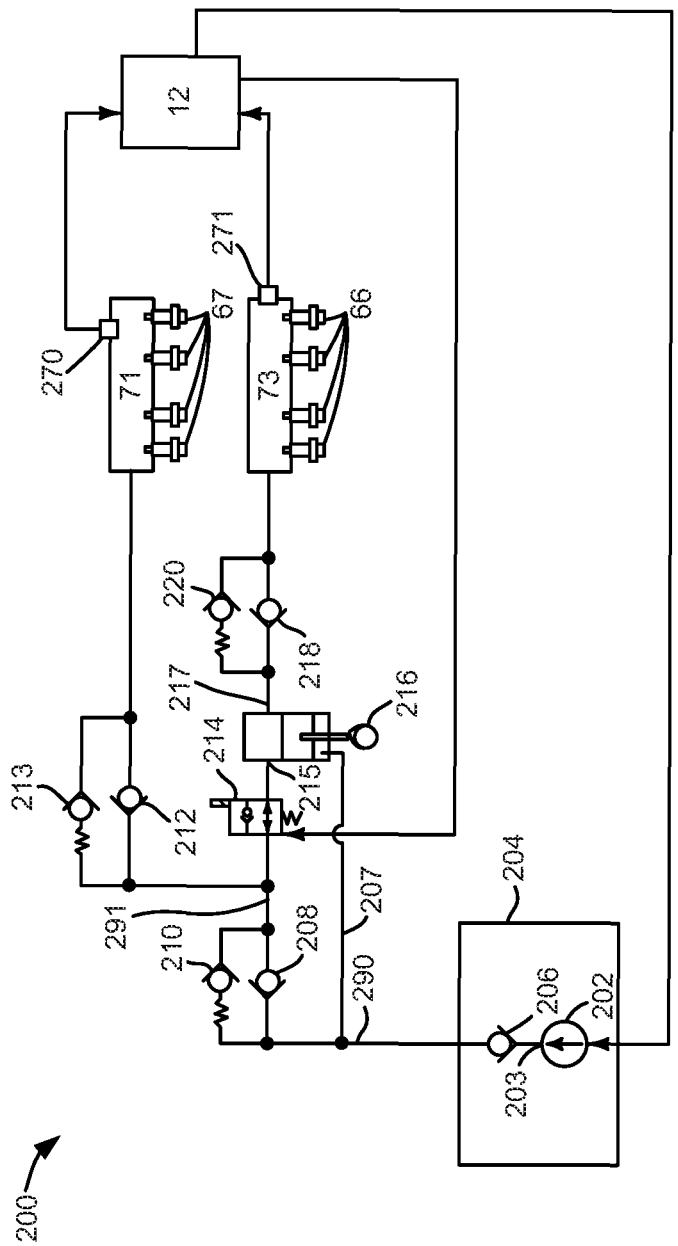
FIG. 2 shows a fuel system schematic.

The present description is related to improving engine air-fuel ratio control for an engine that includes port and direct fuel injectors. Direct and port fuel injectors may be incorporated into an engine as is shown in FIG. 1. Fuel injectors may be part of a fuel system as shown in FIG. 2. The engine and fuel injectors may be operated according to the method of FIG. 3 to improve engine air-fuel control. In addition, the systems of FIGS. 1 and 2 may be operated according to the method of FIG. 3 to provide the operating sequence shown in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 30, which is known to those skilled in the art as direct injection. Port fuel injector 67, injects fuel to intake port 69, which is known to those skilled in the art as port injection. Fuel injector 66 delivers liquid fuel in proportion to a voltage pulse width or fuel injector pulse width of a signal from controller 12. Likewise, fuel injector 67 delivers liquid fuel in proportion to a voltage pulse width or fuel injector pulse width from controller 12. Fuel is delivered to fuel injectors 66 and 67 by a fuel system shown in FIG. 2 including a direct fuel injector fuel rail 73 and a port fuel injector fuel rail 71. Fuel is supplied to direct fuel injector 66 at a higher pressure than fuel is supplied to port fuel injector 67. In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may communicate conditions such as degradation of components to light, or alternatively, display panel 171.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system, comprising: an engine including a cylinder; a port fuel injector in fluidic communication with the cylinder; a direct fuel injector in fluidic communication with the cylinder; a high pressure pump supplying fuel to the port fuel injector and the direct fuel injector; a low pressure pump supplying fuel to the high pressure pump; and a controller including executable instructions stored in non-transitory memory for commanding the high pressure pump based on an amount of fuel injected via the port fuel injector in a first mode, and instructions for commanding the high pressure pump based on an amount of fuel injected via the direct fuel injector in a second mode.

In some examples, the system further comprises additional instructions for activating the port fuel injector in response to a request to inject a fuel amount into the cylinder during a cylinder cycle that would cause the direct fuel injector to operate in a ballistic operating region at the present direct injector operating conditions. The system further comprises additional instructions for activating the port fuel injector in response to a request to inject a fuel amount into the cylinder during a cylinder cycle that is greater than a threshold amount while engine speed is greater than a threshold engine speed at which the direct fuel injector may supply the fuel amount during a predetermined crankshaft interval at the present direct fuel injector operating conditions (e.g., fuel pressure, temperature, etc.). The system includes where the crankshaft interval is from intake valve opening of the cylinder to time of ignition in the cylinder. The system includes where the first mode is a mode where only the port fuel injector supplies fuel to the cylinder. The system includes where the second mode is a mode where only the direct fuel injector supplies fuel to the cylinder.

Historically, port fuel is injected on a closed intake valve to reduce engine emissions. However, a high pressure port fuel injector has smaller droplet size and thus may reduce the possibility of fuel impinging on cylinder was because of improved fuel vaporization. One aspect of the invention is to supplement the direct fuel injection with high pressure port fuel open valve injection. The high pressure for open valve port fuel injection comes from the direct fuel injection pump as shown in FIG. 2. With only two pumps, threes pressures may be established: 1) lift pump pressure, 2) direct fuel injection high pressure, and 3) port fuel injection high pressure. High pressure open valve port fuel injection with small fuel droplet size may have some of the cylinder charge cooling properties of direct fuel injection.

Referring now to FIG. 2, a schematic of an example fuel system is shown. The fuel system of FIG. 2 may be included with the engine system of FIG. 1. Further, the fuel system of FIG. 2 may be operated according to the method of FIG. 3.

Fuel system 200 includes a fuel tank 204 for storing fuel. Fuel may be gasoline or a mixture of gasoline and alcohol.

Low pressure fuel pump 202 supplies fuel to inlet side 215 of high pressure fuel pump 216 via passage or conduit 290 and low pressure pump outlet 203. High pressure pump 216 may be driven via a camshaft or crankshaft of engine 10 shown in FIG. 1. Fuel flow back to low pressure fuel pump 202 is prevented via check valve 206. Fuel supplied by fuel pump 202 may be pressurized in a range from 1.5 to 8 bar, absolute pressure. Check valve 208 is biased such that fuel does not flow from high pressure fuel pump 216 back to low pressure fuel pump 202 via check valve 208. Thus, fuel may be held in conduit 290 even if low pressure fuel pump 202 is commanded off. Pressure control valve 210 does not allow fuel to flow from low pressure fuel pump 202 to high pressure fuel pump 216. Pressure control valve 210 may allow fuel to flow from high pressure fuel pump 216 to low pressure fuel pump 202 if pressure in conduit 291 is greater than a threshold pressure that is greater than the outlet pressure of low pressure fuel pump 202, 30 bar for example. Thus, pressure control valve 210 regulates pressure in conduit 291. Conduit 207 allows fluid communication between a step chamber of solenoid valve and upstream of check valve 208. However, other step room fuel connections are possible including a path described in U.S. Patent publication 20130118449 which is hereby incorporated for all intents and purposes. Fuel pressure for direct fuel injectors may be in a range of 8 to 14 bar, absolute pressure.

Spill control valve or solenoid valve 214 regulates an amount of fuel that enters and exits high pressure pump 216. By adjusting an operating position of solenoid 214 (e.g., opening time and closing time), it is possible to allow a first amount of fuel to enter high pressure pump 216, allow a portion of the first amount to be returned to conduit 291, and allow the remaining portion of fuel to enter direct injection fuel rail 73 via check valve 218 and high pressure fuel pump outlet 217. Fuel enters direct injection fuel rail 73 and is returned to conduit 291 when a piston in high pressure pump 216 is in its compression phase (e.g., when high pressure pump 202 is on its compression stroke). When fuel is drawn into high pressure pump 216 during its suction stroke, fuel is also drawn past check valve 208 and into conduit 291. Consequently, as the piston in high pressure pump 216 moves through its compression stoke, fuel may be returned from high pressure pump 216 into conduit 291, thereby increasing fuel pressure in conduit 291 to a pressure that is greater than the outlet pressure of low pressure pump 202.

Check valve 212 allows high pressure fuel into port fuel injector fuel rail 71 which supplies fuel to port fuel injectors 67. Check valve 212 prevents fuel flow from port fuel injector fuel rail 71 back to high pressure fuel pump 216 and low pressure fuel pump 202. Fuel injected by port fuel injectors 67 is at a pressure greater than fuel pressure at outlet 203 of low pressure fuel pump 202, but at a lower pressure than fuel supplied to direct fuel injectors 66. Pressure relief valve 213 allows fuel to return to solenoid 214 if pressure in high pressure port fuel injection fuel rail 71 is greater than a threshold pressure.

Check valve 218 allows fuel to enter direct fuel injector fuel rail 73 when fuel pressure at high pressure fuel pump 216 is greater than fuel pressure at direct fuel injector fuel rail 73. Pressure relief valve 220 allows fuel to return to high pressure fuel pump 216 from direct fuel injector fuel rail 73 when fuel pressure in direct fuel injector fuel rail 73 is greater than a threshold pressure.

Controller 12 may receive direct fuel injection rail pressure from pressure sensor 271 and port fuel injection rail pressure from pressure sensor 270. Further, controller may adjust opening and closing timing of spill control or solenoid valve 214 to provide a desired pressure in direct fuel injection fuel rail 73 and port fuel injection rail 71. Controller 12 may also adjust a voltage applied to low pressure pump 202 to control flow of low pressure pump 202.

Figure 3:
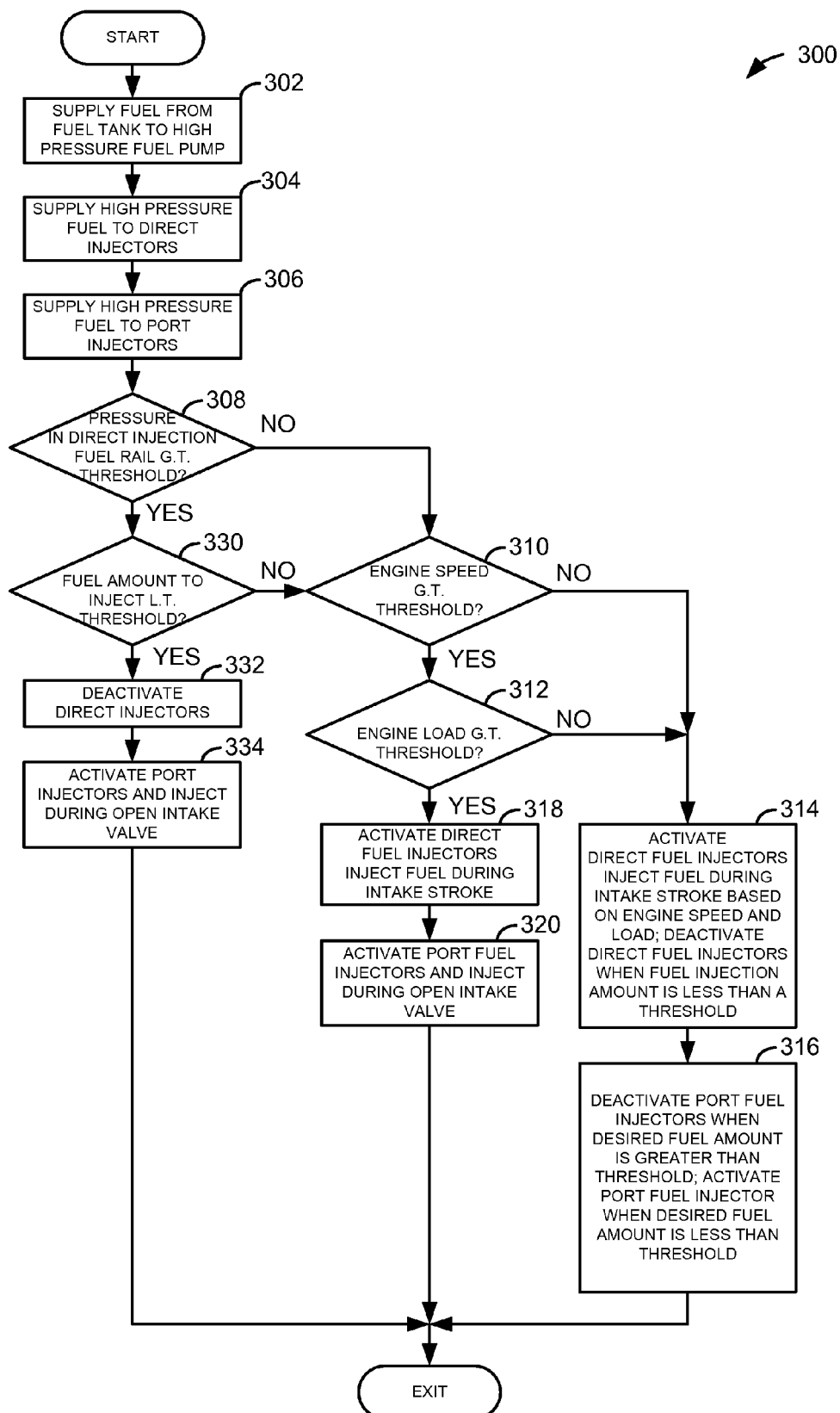
FIG. 3 shows a method for operating fuel injectors.

Referring now to FIG. 3, a method for operating fuel injectors of an engine is shown. The method provided for supplying fuel to each engine cylinder via two fuel injectors. In one example, the first of the two injectors is a direct injector and the second of the two fuel injectors is a port fuel injector. The method of FIG. 3 may be included in the system of FIG. 1 as executable instructions stored in non-transitory memory. Further, the method of FIG. 3 may provide the operating sequence of FIG. 4.

At 302, method 300 supplies fuel from a fuel storage tank to a high pressure pump. The fuel may be pumped from the fuel storage tank to the high pressure pump via a low pressure fuel pump. Output of the low pressure pump may be increased and decreased responsive to engine speed and load. Method 300 proceeds to 304 after fuel is supplied to the high pressure fuel pump.

At 304, method 300 supplies high pressure fuel to direct fuel injectors. The high pressure fuel may be supplied from an outlet of the high pressure fuel pump as shown in FIG. 2. Method 300 proceeds to 306 after high pressure fuel is supplied from the high pressure fuel pump to the direct fuel injectors.

At 306, method 300 supplies high pressure fuel to port fuel injectors. The high pressure fuel may be supplied from an inlet side of the high pressure fuel pump as shown in FIG. 2. Method 300 proceeds to 306 after high pressure fuel is supplied from the high pressure fuel pump to the port fuel injectors.

At 308, method 300 judges if fuel pressure in the direct injection fuel rail is greater than a threshold pressure. In one example, the threshold pressure is a pressure above which the high pressure fuel pump supplies fuel to the fuel rail. The threshold pressure may be reached by heating the fuel rail via engine heat. For example, during deceleration fuel shut-off when fuel flow to one or more cylinders is stopped while the engine continues to rotate, fuel in the direct fuel injector rail may increase in temperature. The increase in fuel temperature causes a corresponding increase in fuel rail pressure. If method 300 judges that pressure in the high pressure fuel rail is greater than a threshold pressure, the answer is yes and method 300 proceeds to 330. Otherwise, the answer is no and method 300 proceeds to 310.

At 330, method 300 judges if the amount of fuel to be injected to engine cylinders is less than a threshold amount. In one example, the threshold amount of fuel is an amount of fuel that requires a direct fuel injector supplying fuel to a cylinder to operate in a ballistic mode. The direct fuel injector supplying fuel to the cylinder may operate in a ballistic or non-linear fuel flow region when a voltage pulse width supplied to the direct fuel injector via the engine controller is less than a threshold duration (e.g., less than 400 micro seconds). The amount of fuel to be injected to the cylinder may be based on engine speed and load. Further, the voltage pulse width to supply the amount of fuel based on engine speed and load may be adjusted for fuel pressure in the direct fuel injector rail. Consequently, as direct fuel injection fuel rail pressure increases, the voltage pulse width is reduced to provide a constant amount of fuel in the presence of increasing fuel rail pressure. If the amount of fuel to be injected when fuel pressure in the direct fuel injector fuel rail is greater than a threshold pressure is less than an amount that causes the direct fuel injector supplying desired fuel amount to the cylinder to operate in a linear operating region (e.g., the direct fuel injector operates in a ballistic mode when supplying the desired fuel amount at the present fuel pressure in the direct fuel injection fuel rail), the answer is yes and method 300 proceeds to 332. Otherwise, the answer is no and method 300 proceeds to 310.

At 332, method 300 deactivates direct fuel injectors that supply fuel to the cylinders. The direct fuel injectors are deactivated so that the direct fuel injectors do not supply more or less fuel than is desired to engine cylinders. In other words, method 300 avoids operating the direct fuel injectors supplying fuel to the cylinders so that the direct fuel injectors will not be operated in a ballistic or non-linear operating region. Method 300 proceeds to 334 after the direct fuel injector is deactivated.

At 334, method 300 port fuel injectors of the cylinders having a deactivated direct fuel injector are activated and fuel is injected to the cylinder at a time the cylinder's intake valves are open. Thus, a port fuel injector injects fuel during open valve timing of a cylinder having the deactivated direct fuel injector. By injecting high pressure fuel via a port fuel injector during an open intake valve timing of the cylinder receiving the fuel, the cylinder's charge mixture may be cooled to improve engine power as compared to if low pressure port injected fuel were supplied to the cylinder. Further, since fuel pressure supplied to the engine's port fuel injector is lower than pressure of fuel supplied to the engine's direct fuel injectors, fuel injection durations may be increased so that the port fuel injector is not operating in its ballistic region. The port fuel injectors inject fuel to the respective cylinders during each cycle of the respective cylinders.

Additionally at 334, method 300 may adjust opening and closing time of the direct injection fuel pump spill valve based on an amount of fuel being injected by only the port fuel injectors. Further, in some examples, the opening and closing time of the direct fuel injection pump may be adjusted in response to a fuel pressure in the port fuel injection rail. In this way, direct fuel injection pump operation may be adjusted to maintain pressure in the port fuel injector fuel rail at a desired pressure. Method 300 proceeds to exit after the port fuel injector is activated.

At 310, method 300 judges if engine speed is greater than a threshold speed. In one example, the threshold speed is an engine speed where there is less than a desired amount of time to inject fuel to a cylinder via the direct fuel injector. An amount of time the direct fuel injector has to inject the fuel is decreased as engine speed increases. For example, at 6000 RPM a direct fuel injector has only 5 milliseconds to inject fuel during an intake stroke of the engine. Consequently, the direct fuel injector may not have sufficient time to inject a desired amount of fuel to mix with air entering the cylinder at a desired air-fuel ratio (e.g., 14.64).

Alternatively at 310, method 300 may determine a desired amount of fuel to inject to one or more cylinders during the respective cycles of the cylinders. The desired amount of fuel may be empirically determined and stored in memory indexed based on engine speed and load. If the direct fuel injectors are capable of injecting the desired amount of fuel within a specified crankshaft interval (e.g., a number of crankshaft degrees between intake valve opening and initiation of spark in the cylinder receiving the fuel), it is determined that the direct fuel injectors may solely inject fuel to the respective cylinders receiving the fuel from the respective corresponding direct injectors and method 300 proceeds to 314. Otherwise, method 300 proceeds to 318.

At 312, method 300 judges if engine load is greater than a threshold load. In one example, the load level corresponds with the engine speed threshold at 310 so that if engine load is greater than the threshold load and engine speed is greater than a threshold speed, the corresponding amount of fuel to inject to engine cylinders is greater than an amount a direct fuel injector may inject to a cylinder during a prescribed crankshaft interval of the cylinder's cycle. If method 300 judges that engine load is greater than the threshold, the answer is yes and method 300 proceeds to 318. Otherwise, the answer is no and method 300 proceeds to 314.

At 318, method 300 activates direct fuel injectors and supplies a portion of the desired fuel amount to engine cylinders. The direct fuel injector supplying fuel to a cylinder may be activated during an intake stroke of the cylinder receiving the fuel. For example, each direct injector of each cylinder may inject a portion of the desired amount of fuel supplied to the respective cylinder receiving fuel during a cycle of the cylinder receiving the fuel. Thus, for an individual cylinder, the individual cylinder's direct fuel injector supplies fuel to the individual cylinder during the individual cylinder's intake stroke. The direct injector supplying fuel to the individual cylinder supplies a fraction or portion of a desired amount of fuel supplied to the individual cylinder during a cycle of the individual cylinder. Further, in some examples, fuel injected directly to a cylinder may be injected during a compression stroke of the cylinder receiving the fuel or during intake and compression strokes of the cylinder receiving the fuel. Method 300 proceeds to 320 after direct fuel injectors are activated.

At 320, method activates high pressure port fuel injectors and injects the remaining portion of the desired fuel amount supplied to engine cylinders during respective cycles of the engine cylinders. Thus, for the individual cylinder mentioned at 318, a high pressure port fuel injector supplies a remaining fraction or portion of the desired amount of fuel supplied to the individual cylinder during the cycle of the cylinder. The fuel provided by the high pressure port fuel injectors is injected while intake valves of the cylinder receiving the fuel are open. As a result, the injected port fuel tends to cool the cylinder's charge, thereby reducing the possibility of engine knock so that spark timing may be advanced. Method 300 proceeds to exit after fuel begins to be injected via port and direct fuel injectors.

At 314, method 300 activates direct fuel injectors and supplies fuel via the direct fuel injectors during intake strokes of the cylinders receiving the fuel. The amount of fuel supplied to the direct injectors may be based on engine speed and load. Alternatively, load may be replaced via driver demand torque. The amount of fuel may be empirically determined and stored in a table or function that is indexed via engine speed and driver demand/engine load. Additionally, the direct fuel injectors may be deactivated if the desired amount of fuel to inject to engine cylinders is less than a threshold amount (e.g., an amount of fuel in the direct injector's ballistic operating range). Method 300 proceeds to 316 after the direct fuel injectors begin to operate as described.

At 316, method 300 deactivates high pressure port fuel injectors in response to the desired amount of fuel to inject to the cylinders during a cylinder cycle being greater than the threshold amount mentioned at 314. Thus, the high pressure port fuel injectors may be deactivated during conditions where direct injection may be performed to provide the desired fuel amount to engine cylinders. On the other hand, the high pressure port fuel injectors may be activated in response to the desired amount of fuel to inject to cylinders being less than a desired amount. In this way, high pressure port fuel injectors may be active when direct fuel injector performance is or would be non-linear to supply the desired amount of fuel to a cylinder.

Additionally at 316, method 300 may adjust opening and closing time of the direct injection fuel pump spill valve based on an amount of fuel being injected by only the direct fuel injectors. Further, in some examples, the opening and closing time of the direct fuel injection pump may be adjusted in response to a fuel pressure in the direct fuel injection rail. In this way, direct fuel injection pump operation may be adjusted to maintain pressure in the direct fuel injector fuel rail at a desired pressure. Method 300 proceeds to exit after port fuel injectors begin to operate as described.

Thus, the method of FIG. 3 provides for a method for fueling a cylinder, comprising: activating a port fuel injector in response to a request to inject a fuel amount into a cylinder during a cylinder cycle while engine speed is greater than a threshold engine speed at which a direct fuel injector may supply the fuel amount during a predetermined crankshaft interval, and where the fuel amount provides a stoichiometric air-fuel ratio. The method includes where the crankshaft interval is from intake valve opening of the cylinder to time of ignition in the cylinder. The method further comprises pumping fuel via a low pressure fuel pump to a high pressure fuel pump, and supplying fuel pressurized by the high pressure fuel pump to the port fuel injector and the direct fuel injector.

In some examples, the method further comprises deactivating the port fuel injector after activating the port fuel injector in response to a request to inject a fuel amount into the cylinder during the cylinder cycle that is less than the threshold amount while engine speed is greater than the threshold engine speed at which the direct fuel injector may supply the fuel amount during the predetermined crankshaft interval. The method further comprises injecting fuel via the port fuel injector during the cylinder cycle. The method includes where the fuel amount is provided by the port fuel injector and the direct fuel injector. The method includes where the port fuel injector injects fuel while an intake valve of the cylinder is open.

The method of FIG. 3 also provides for a method for fueling a cylinder, comprising: activating a port fuel injector in response to a request to inject a fuel amount into a cylinder during a cylinder cycle that would cause a direct fuel injector to operate in a ballistic operating region at the present direct fuel injector operating conditions. The method further comprises pumping fuel via a low pressure fuel pump to a high pressure fuel pump, and supplying fuel pressurized by the high pressure fuel pump to the port fuel injector and the direct fuel injector. The method includes where fuel supplied to the port fuel injectors is a higher pressure than a pressure at an outlet of the low pressure fuel pump.

In some examples, the method includes where the port fuel injector supplies fuel to the cylinder during intake valve opening of the cylinder. The method includes where the ballistic operating region is a non-linear fuel flow region through the direct fuel injector, and where the non-linear fuel flow region through the direct fuel injector is activated via supplying a voltage pulse to the direct fuel injector that is less than a threshold time. The method includes where the fuel amount is requested when an engine in which the cylinder operates is at idle. The method further comprises deactivating the direct fuel injector in response to the request to inject the fuel amount into the cylinder, and where the fuel amount is based on engine idle conditions.

Having two injection systems, such as high pressure port injected and direct injection may have advantages. For example, the high pressure port injected fuel is applied as open intake valve injection which may retain much of the cooling benefits of direct injection. Closed valve low pressure port fuel injection may not achieve the same desired level of cooling benefit as high pressure port fuel injection. The high pressure fuel supplied to the port fuel injectors is a pressure which is in-between the lift pump pressure and the maximum direct injection fuel pressure, and the high pressure fuel supplied to the port fuel injectors is provided by a modified form of a direct fuel injection fuel pump.

Figure 4:
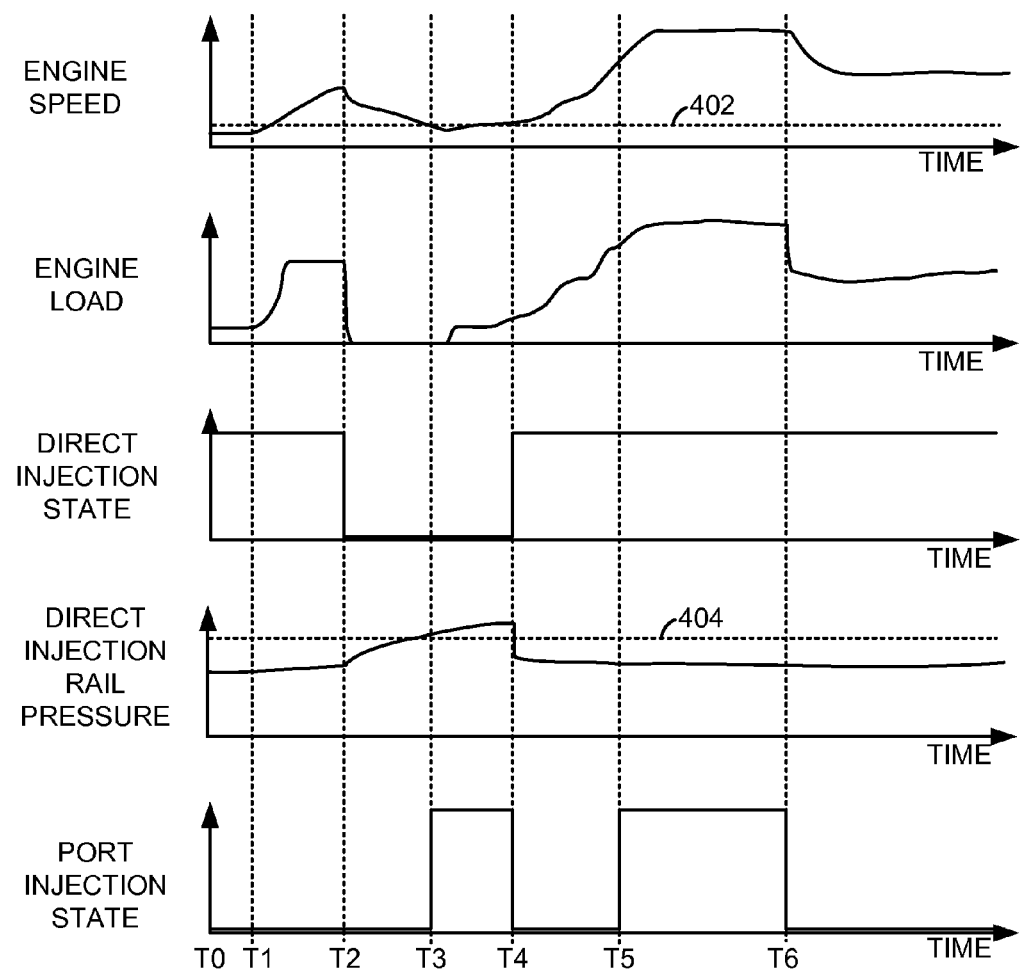
FIG. 4 shows an engine operating sequence.

Referring now to FIG. 4, a fuel injector operating sequence for adjusting fuel injection according to the method of FIG. 2 is shown. Vertical markers T1-T6 represent times of interest during the sequence. The sequence of FIG. 4 may be provided via the system of FIGS. 1 and 2 according to the method of FIG. 3.

The first plot from the top of FIG. 4 is a plot of engine speed versus time. The Y axis represents engine speed and engine speed increases in the direction of the Y axis arrow. The X axis represents time and time increases from the left side of the plot to the right side of the plot. Horizontal line 402 represents an engine speed below which the engine exits deceleration fuel shut-off mode to reactivate the engine.

The second plot from the top of FIG. 4 is a plot of engine load versus time. Alternatively, the plot may be interpreted as a plot of driver demand torque versus time. The Y axis represents engine load and engine load increases in the direction of the Y axis arrow. The X axis represents time and time increases from the left side of the plot to the right side of the plot.

The third plot from the top of FIG. 4 is a plot of direct fuel injector operating state versus time. The Y axis represents direct fuel injector operating state and direct fuel injector operating state indicates that direct fuel injectors are active when the trace is at a higher level near the Y axis arrow. Direct fuel injectors are deactivated when the trace is at a lower level near the X axis. The X axis represents time and time increases from the left side of the plot to the right side of the plot.

The fourth plot from the top of FIG. 4 is a plot of fuel pressure in a fuel rail supplying fuel to a direct fuel injector versus time. The Y axis represents fuel pressure in the fuel rail and fuel pressure increases in the direction of the Y axis arrow. The X axis represents time and time increases from the left side of the plot to the right side of the plot. Horizontal line 404 represent a threshold fuel pressure above which direct fuel injectors are not activated when engine load is less than a threshold because activating the direct fuel injectors would require the direct fuel injectors to operate in a ballistic mode to provide the desired engine air-fuel ratio.

The fifth plot from the top of FIG. 4 is a plot of port fuel injector operating state versus time. The Y axis represents port fuel injector operating state and port fuel injector operating state indicates that port fuel injectors are active when the trace is at a higher level near the Y axis arrow. Port fuel injectors are deactivated when the trace is at a lower level near the X axis. The X axis represents time and time increases from the left side of the plot to the right side of the plot.

At time T0, the engine speed and load are at low levels. The direct fuel injectors are active and the port fuel injectors are deactivated as is indicated by the level of their respective traces. Direct fuel injector rail pressure is at a medium level.

At time T1, the engine speed and load begin to increase in response to an increase in driver demand torque (not shown). The direct fuel injectors remain active and the port fuel injectors remain deactivated. The direct fuel injector fuel rail pressure increases in response to increasing engine load and speed.

Between time T1 and time T2, the engine load levels off at a higher level and engine speed continues to increase in response to the higher engine load. The direct fuel injectors remain active and the port fuel injectors remain deactivated. The direct fuel injector fuel rail pressure increases as engine speed and load increase.

At time T2, the engine load is reduced in response to a reduction in driver demand torque (not shown) and the vehicle enters deceleration fuel shut-off (e.g., the engine continues to rotate as direct and port fuel injectors are deactivated) in response to the low engine load and engine speed. The direct fuel injector fuel rail pressure begins to increase as heat from the engine warms fuel in the direct fuel injection fuel rail. The engine speed begins to decrease in response to the reduced engine load.

Between time T2 and time T3, the pressure in the direct fuel injector fuel rail continues to increase in response to heating fuel in the fuel rail and the direct fuel injectors not injecting fuel into the engine. By not injecting fuel into the engine, fuel in the direct fuel injector fuel rail may stay stationary, thereby allowing the fuel to be heated by the engine. The direct fuel injectors and the port fuel injectors remain deactivated and the engine speed continues to decrease. The engine load remains at a lower level.

At time T3, the engine speed is reduced to a level less than threshold 402 so combustion in the engine is reactivated by enabling port fuel injectors. The direct fuel injectors are not reactivated because pressure in the direct fuel injector fuel rail is greater than threshold 404 and because engine load is at a low level. Operating direct injectors during such conditions would cause the direct fuel injectors to operate in a ballistic mode for the engine to operate at a desired air-fuel ratio (e.g., stoichiometric air-fuel ratio). Therefore, activation of the direct fuel injectors is inhibited. The port fuel injectors begin to inject fuel to engine cylinders during a time when intake valves of the engine cylinder receiving the fuel are open. By port injecting high pressure fuel may allow improved fuel vaporization as compared to low pressure port fuel injected engines. Consequently, engine efficiency may be improved by allowing the engine to operate with additional spark advance timing. Fuel pressure in the direct injector fuel rail continues to rise as the engine is reactivated. Additionally, engine speed levels off to a lower value and engine load remains at a lower value.

Between time T3 and T4, the engine load increases in response to an increase in driver demand torque (not shown). Further, engine speed begins to increase and fuel pressure in the direct fuel injector fuel rail continues to increase. The direct fuel injectors remain deactivated and the port fuel injectors remain activated. The direct fuel injectors remain deactivated because providing the desired amount of fuel to the engine via the direct injectors would require operating the direct fuel injectors in a ballistic mode since pressure in the direct fuel injector fuel rail is at a higher level.

At time T4, engine speed and load have continued to increase in response to driver demand torque increasing to a level where the desired fuel amount may be provided by the direct fuel injectors, even at the higher direct fuel injector fuel rail pressure, operating in their linear operating region (e.g., not in the ballistic operating region). Therefore, the direct fuel injectors are reactivated and the port fuel injectors are deactivated in response to the direct fuel injector's capacity to provide the desired fuel amount in a non-ballistic or a linear operating mode (e.g., a minimum direct fuel injector pulse width is exceeded for the direct fuel injector to provide the desired fuel amount). By operating the direct fuel injectors, additional charge cooling may be provided so that spark timing may be advanced to increase engine efficiency. The pressure in the direct fuel injector fuel rail decreases in response to activating the direct fuel injectors.

At time T5, the engine speed and load have reached higher levels where the direct fuel injector is not capable of providing a desired fuel amount to provide a desired engine air-fuel ratio (e.g., stoichiometric air-fuel ratio) in a predetermined crankshaft interval (e.g. intake valve opening time to crankshaft angle where spark is initiated). Therefore, the port fuel injectors are activated while the direct fuel injectors are activated to allow the engine fuel amount to mix with the engine air amount and produce a desired engine air-fuel ratio. The port fuel injectors are activated at an engine speed and load combination where the direct fuel injectors may not provide the desired engine fuel amount because the direct fuel injection interval is reduced due to the increase in engine speed. The direct fuel injector fuel rail pressure continues at a middle level.

At time T6, the engine load is reduced in response to a reduction in driver demand torque (not shown). The engine speed also begins to decay in response to the reduction in engine load and the port fuel injectors are deactivated in response to the direct fuel injectors having the capability of injecting a desired amount of fuel to produce a desired air-fuel ratio (e.g., stoichiometric air-fuel ratio). The direct fuel injector fuel rail pressure continues at a middle level.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:
1. A method for fueling a cylinder, comprising:
  activating a port fuel injector in response to a request to
    inject a fuel amount into a cylinder during a cylinder cycle, the fuel amount when injected via a direct fuel injector causes the direct fuel injector to operate in a ballistic operating region.

2. The method of claim 1, further comprising pumping fuel via a low pressure fuel pump to a high pressure fuel pump, and supplying fuel pressurized by the high pressure fuel pump to the port fuel injector and the direct fuel injector.

3. The method of claim 2, where fuel supplied to the port fuel injector is a higher pressure than a pressure at an outlet of the low pressure fuel pump.

4. The method of claim 1, where the port fuel injector supplies fuel to the cylinder during intake valve opening of the cylinder.

5. The method of claim 1, where the ballistic operating region is a non-linear fuel flow region, and where the non-linear fuel flow region is activated via supplying a voltage pulse to the direct fuel injector that is less than a threshold time.

6. The method of claim 1, where the fuel amount is requested when an engine in which the cylinder operates is at idle.

7. The method of claim 1, further comprising deactivating the direct fuel injector in response to the request to inject the fuel amount into the cylinder, and where the fuel amount is based on engine idle conditions.

* * * * *